UNITED STATES PATENT OFFICE.

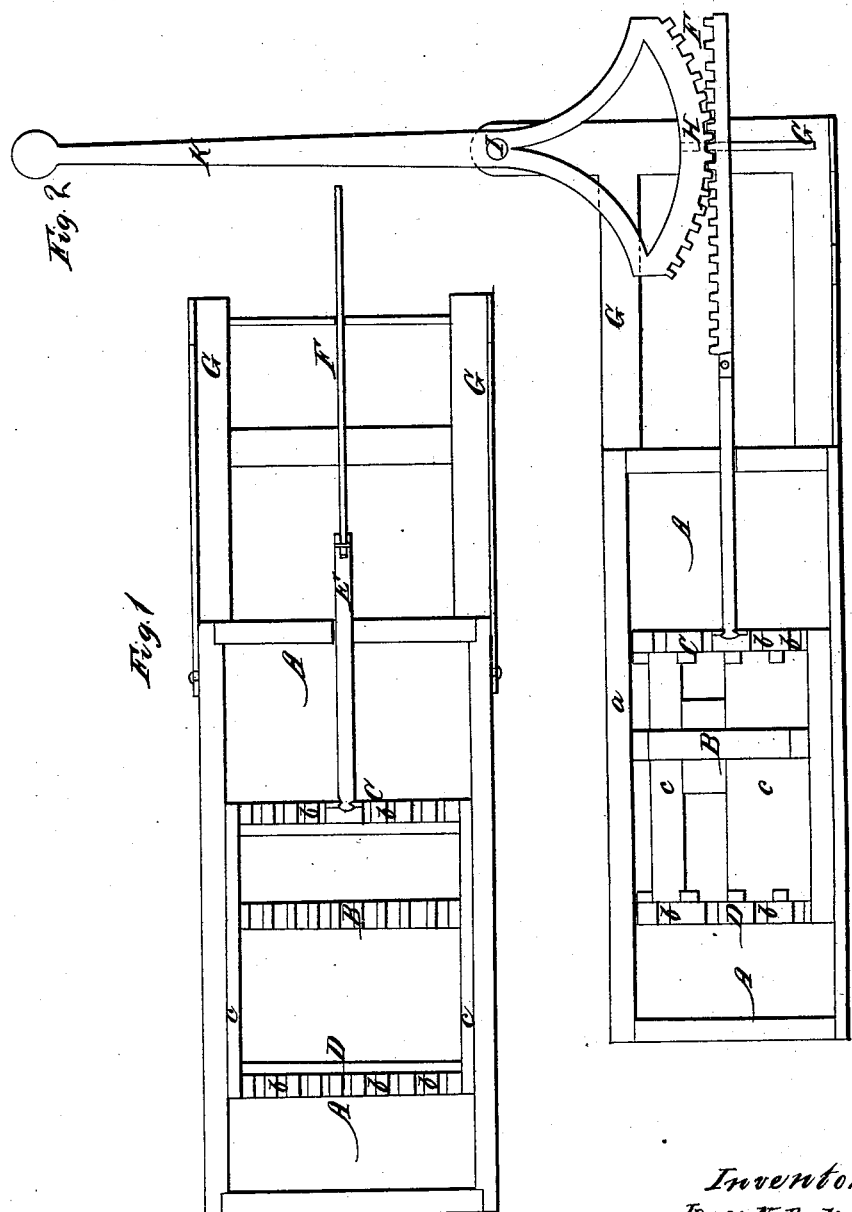

ISAAC N. BEALS, OF MIDDLEBOROUGH, MASSACHUSETTS.

WASHING-MACHINE.

Specification forming part of Letters Patent No. 48,893, dated July 25, 1865.

*To all whom it may concern:*

Be it known that I, ISAAC N. BEALS, of Middleborough, in the county of Plymouth and State of Massachusetts, have invented an Improved Washing Machine; and I do hereby declare the same to be fully described in the following specification and represented in the accompanying drawings, of which—

Figure 1 is a horizontal, and Fig. 2 a vertical and longitudinal, section of it.

The nature of my invention consists in a combination and arrangement of two reciprocating and connected dashers and an upright grating or perforated frame as applied to a tub or tank; also, in the combination of such with mechanism for operating the two dashers.

In the drawings, A denotes an oblong tub or tank, open at top, and provided with a cover, $a$, applied to it by means of hinges. Extending across the middle of the said tank is an upright grid or grating, B, on opposite sides of which are arranged, as shown in the drawings, two plungers or dashers, C D, each of which is provided with numerous perforations $b$ $b$ $b$. The said two dashers are connected by means of bars $c$ $c$, which extend from one to the other of them and through the stationary grid B.

A rod, E, fastened to the center of one of the dashers, passes through one end of the tank or tub, and is joined to a toothed rack, F, which is upheld by a frame, G, and engages with a toothed sector, H, extending down from a horizontal shaft, I. The said shaft is provided with a lever or arm, K, which projects from it or from the hub of the sector, in manner as shown in Fig. 2. By laying hold of the said arm K and moving it and the sector back and forth a reciprocating rectilinear motion may be imparted to the two dashers. The clothes to be washed should be placed in the spaces between the two dashers and the grid. By the peculiar action of the dashers the washing-fluid will be forced in streams against and through the clothes, which will also be alternately compacted and distended, their detersion being produced by the streams of liquid forced through the grid by a dasher while in the act of approaching it.

The washing-machine so made will operate to excellent advantage.

I claim in the said machine—

1. The combination and arrangement of the two reciprocating and connected dashers C D and the upright grid B applied to the tank.

2. The combination of the same and mechanism, as described, for operating the two dashers.

ISAAC N. BEALS.

Witnesses:
R. H. EDDY,
F. P. HALE, Jr.